United States Patent [19]

Carlin et al.

[11] 4,303,487

[45] Dec. 1, 1981

[54] PRODUCTION OF ALKALI METAL SILICATE HAVING A HIGH SILICA TO ALKALI METAL OXIDE RATIO

[75] Inventors: William W. Carlin, Portland; Douglas W. McCann, Corpus Christi, both of Tex.

[73] Assignee: PPG Industries, Inc., Pittsburgh, Pa.

[21] Appl. No.: 107,221

[22] Filed: Dec. 26, 1979

Related U.S. Application Data

[63] Continuation-in-part of Ser. No. 897,962, Apr. 19, 1978, abandoned.

[51] Int. Cl.[3] .................... C25B 7/00

[52] U.S. Cl. .................... 204/180 P; 204/86; 423/332

[58] Field of Search .................... 204/180 P, 301, 101, 204/96, 86; 423/332

[56] References Cited

U.S. PATENT DOCUMENTS

| | | | |
|---|---|---|---|
| 1,557,491 | 10/1925 | Codd | 204/101 X |
| 1,562,940 | 11/1925 | Collins | 204/101 X |
| 2,223,929 | 12/1940 | Lowenstein | 204/86 |
| 3,645,865 | 2/1972 | Tripp | 204/96 |
| 3,654,105 | 4/1972 | Chilton | 204/101 |
| 3,668,088 | 6/1972 | Iler | 204/101 |
| 3,712,941 | 1/1973 | Myers | 423/332 |
| 3,723,273 | 3/1973 | Wilson | 204/180 P |
| 3,734,842 | 5/1973 | Cooper | 204/86 |
| 4,147,605 | 4/1979 | Schenker et al. | 204/101 X |

*Primary Examiner*—F. Edmundson

*Attorney, Agent, or Firm*—Edward J. Whitfield; Irwin M. Stein; Richard M. Goldman

[57] ABSTRACT

A process is disclosed for increasing the silica to alkali metal oxide weight ratio of aqueous alkali metal silicate solution by electrodialysis of the alkali metal silicate solution.

4 Claims, 1 Drawing Figure

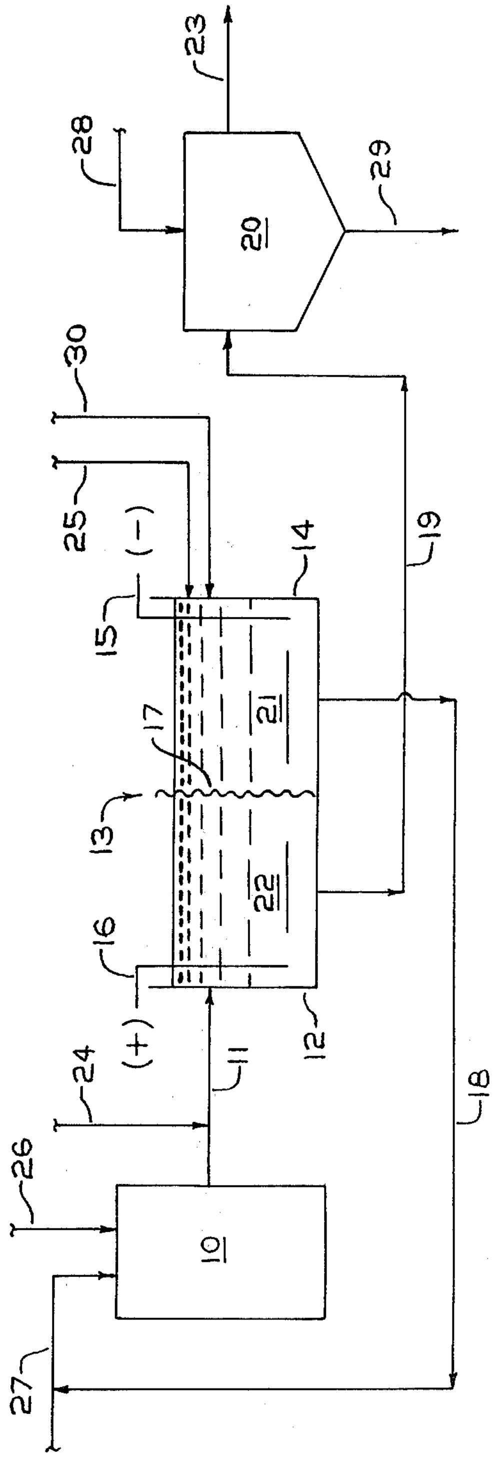
10
11
12
13
14
15
16
17
18
19
20
21
22
23
24
25
26
27
28
29
30
(+)
(−)

PRODUCTION OF ALKALI METAL SILICATE HAVING A HIGH SILICA TO ALKALI METAL OXIDE RATIO

CROSS-REFERENCE TO RELATED APPLICATION

This application is a continuation-in-part of copending U.S. application Ser. No. 897,962 filed Apr. 19, 1978, now abandoned.

BACKGROUND OF THE INVENTION

Hydrated silicas are widely used as fillers, pigments, and reinforcing agents in formulating rubbrous materials. Hydrated silica is typically prepared by reacting an alkali metal silicate solution, for example, sodium silicate solution, with carbon dioxide to precipitate silica of the desired particle size. Sodium silicate solution is typically produced by one of two methods, namely, the fusion process and the hydrothermal process.

In the fusion process, silica sand ($SiO_2$) and soda ash ($Na_2CO_3$) are melted in a furnace at a temperature of about 1400° C. The melt is then quenched in water to produce an aqueous sodium silicate solution. Although it is reported that sodium silicate having $SiO_2$:$Na_2O$ weight ratios as high as 3.75:1 may be produced by the fusion process, it is generally not commercially practicable to produce sodium silicate by the fusion process having a $SiO_2$:$Na_2O$ weight ratio greater than about 3.2:1, since such higher ratio sodium silicates have been found to be unstable under process conditions. Moreover, the fusion process is disadvantageous from energy consumption and maintenance standpoints.

In the hydrothermal process, silica sand ($SiO_2$) is reacted with concentrated, i.e., about 50 percent, aqueous sodium hydroxide solution at a moderately elevated temperature to produce an aqueous sodium silicate solution. Typically, the sand and caustic solution are reacted in an autoclave at super-atmospheric pressure and a temperature of about 200° C. The $SiO_2$:$Na_2O$ weight ratio in sodium silicate solutions produced by the hydro-thermal process typically ranges from about 2:1 to a maximum of about 2.5:1. Thus, although the energy consumption of the hydrothermal process is considerably less than that of the fusion process, desirable high ratio sodium silicate, i.e., sodium silicate having a $SiO_2$:$Na_2O$ weight ratio greater than about 2.5:1, cannot as a practical matter be produced.

It has now been found that the silica:alkali metal oxide weight ratio of alkali metal silicate, particularly a sodium silicate typically produced by the hydrothermal process, can be increased to a ratio at least as high and higher than that obtained by the fusion process with an overall reduction in energy consumption and maintenance costs.

DESCRIPTION OF THE DRAWING

The drawing is a simplified schematic flow sheet of a preferred embodiment of the process of the invention.

SUMMARY OF THE INVENTION

The silica:alkali metal oxide weight ratio of an aqueous alkali metal silicate solution is enriched to a higher silica:alkali metal oxide weight ratio by electrodialysis of the lower ratio alkali metal silicate solution.

DESCRIPTION OF THE INVENTION

In accordance with a preferred embodiment of this invention, aqueous sodium silicate solution of the type typically produced by the hydrothermal process, wherein silica sand is reacted with concentrated aqueous sodium hydroxide solution, and having a $SiO_2$:$Na_2O$ weight ratio of up to about 2.5:1 may be enriched to a $SiO_2$:$Na_2O$ weight ratio of up to about 4.5:1 by subjecting the lower ratio sodium silicate to electrodialysis in an electrolytic cell provided with a cation selective permionic membrane.

According to the process of the invention, an electrolytic cell is provided, said cell having an anode compartment provided with an anodic surface and a cathode compartment provided with a cathodic surface, said compartments separated by a cation selective permionic membrane. The lower ratio sodium silicate solution is charged to the anode compartment and water or an aqueous sodium hydroxide solution is charged to the cathode compartment. A direct current is applied across the cell which promotes decomposition of sodium oxide at the anode into sodium ions with evolution of oxygen gas and promotes decomposition of water to hydroxyl ions at the cathode with evolution of hydrogen gas. The sodium ions in the anolyte migrate through the membrane and combine with the hydroxyl ions in the catholyte to form sodium hydroxide. The overall reaction involves removal of sodium oxide from the sodium silicate solution thus increasing the weight ratio of silica to sodium oxide therein.

The reactions taking place within the cell may be represented as follows:

$$\text{Cathode Reaction: } 2H_2O + 2e^- \rightarrow H_2 + 2OH^-$$

$$\text{Anode Reaction: } Na_2O \rightarrow 2Na^+ + 1/2O_2 + 2e^-$$

$$\text{Net Reaction: } Na_2O + 2H_2O \rightarrow 2NaOH + H_2 + 1/2O_2.$$

The cathodic and anodic surfaces or electrodes are formed of electrically conducting materials such as, for example, graphite, carbon, nickel, cobalt, silver, steel, iron, platinum, tantalum, palladium, iridium, and the like. Platinum-iridium coated titanium is preferred for use as the anode as it has been found to be less prone to fouling. A mild steel cathode has been found to be satisfactory.

The cation selective permionic membrane is comprised principally of cation exchange resin formed into a thin sheet. The membrane is substantially impermeable to water, the catholyte, the anolyte, and anions but is highly permeable to cations. Cation selective permionic membranes of a type suitable for use in accordance with the invention are well known and commercially available. Typically, such membranes are constructed by fixing cation exchange resins such as, for example, carboxylic acid or sulfonic acid group containing resins into a porous reinforcing matrix such as fiber glass fabric, cellulose paper, asbestos, polyvinylchloride, and the like.

Cation exchange membranes prepared from fluorinated polymers containing pendant side chains containing sulfonyl groups or fluorinated copolymers containing carboxylic acid groups as described, for example, in U.S. Pat. Nos. 3,784,399 and 4,065,366 are particularly well suited for use in the process of the invention.

The sodium silicate solution preferred for use as the anolyte according to the invention is one prepared by the known hydrothermal process wherein concentrated sodium hydroxide solution is reacted with silica preferably at super-atmospheric pressure and a moderately elevated temperature, i.e., about 200° C. The sodium silicate solution prepared by the hydrothermal process typically has a weight ratio of silica to sodium oxide of from about 2.0:1 to about 2.5:1 and a pH of at least 11 and typically greater than 11.5. For use in accordance with the invention, the said sodium silicate solution is preferably diluted with water to a total water content of at least about 75 percent by weight, preferably from about 80 to 90 percent or more by weight. Although less dilute 2.5 ratio sodium silicate solutions have been used, i.e., about 60 percent water content, the same has been found to result in excessive cell voltage and fouling at the anode under process conditions.

This invention avoids formation of a colloidal suspension or sol of finely divided silica particles, both the starting material as well as the end product being uniform aqueous solutions of sodium silicate. Formation of a colloidal suspension or sol of finely divided silica particles during electrodialysis is disadvantageous since the silica particles tend to deposit on the anode surface and impair cell operating efficiency.

Formation of a colloidal suspension or sol of finely divided silica particles is avoided provided the alkali metal silicate solution starting material has a pH of at least about 11 and preferably a pH greater than 11.5. During electrodialysis, the pH decreases somewhat as the silica: alkali metal oxide weight ratio increases, however the pH of the product alkali metal silicate solution has always been observed to be greater than 10, typically greater than 10.5, over the range of silica to alkali metal oxide weight ratios in the product alkali metal silicate solutions contemplated by this invention, i.e., alkali metal silicate solutions having silica:alkali metal oxide weight ratios of from about 3:1 to about 4.5:1.

Although water alone may be used as the catholyte in start-up of the process, in order to enhance electrolysis of the water, to provide a more electrically conductive medium as well as to avoid excessively high voltages on cell start-up, it is preferred to charge the cathode compartment initially with aqueous sodium hydroxide solution. The sodium hydroxide concentration in the catholyte initially charged to the cell may vary over a wide range, for example, from about 0.0001 percent to 50 percent or more by weight. The tolerable concentration of sodium hydroxide in the catholyte solution both initially charged and formed during the course of the electrodialysis depends, however, on the nature of the permionic membrane.

It has been observed that as the sodium hydroxide concentration in the catholyte increases, the membrane tends to become less cation selective and hydroxyl ions in the catholyte tend to back migrate through the membrane into the anolyte, thus lowering the sodium hydroxide concentration in the catholyte and resulting in a reduction in cell efficiency.

Since it is desirable to maintain the sodium hydroxide concentration in a catholyte as high as possible while minimizing back migration of hydroxyl ions, both to optimize cell efficiency and to reduce evaporation requirements when recovering the sodium hydroxide, depending on user's requirements, it may be necessary to test a variety of available cation selective permionic membranes to determine which type is best suited for a particular need.

The electrolytic cell may be operated over a wide range of current densities, for example, from about 20 to 200 amperes per square foot of apparent electrode surface, preferably from about 80 to 120 amperes per square foot with an apparent optimum at about 100 amperes per square foot. Likewise, the cell voltage may also vary over a wide range, for example, from about 2 to 10 volts, typically from about 5 to 7 volts. The minimum operating voltage must be at least in excess of that required to obtain electrolysis of water, i.e., at least about 1.23 volts.

With reference to the drawing, in a typical practice of the invention, silica sand ($SiO_2$) and 50 percent aqueous sodium hydroxide solution are charged via lines 26 and 27 respectively to an autoclave 10. The relative proportion of sand and sodium hydroxide solution used determine the ratio of silica to sodium oxide in the sodium silicate solution. Typically from about 0.7 to 1.1 parts by weight of sand are used per part by weight of 50 percent sodium hydroxide solution. The silica sand and sodium hydroxide are reacted at a temperature of about 150° C. to about 250° C., usually about 200° C., and a pressure of from about 300 to about 500 psig. The sodium silicate solution effluent, having a pH of at least 11 and a $SiO_2$:$Na_2O$ ratio of up to about 2.5:1 (which is about the optimum obtainable under typical hydrothermal process conditions), is diluted with water via line 24 to a total water content of at least about 75 percent and preferably from about 80 to 90 percent or more by weight and is charged via line 11 to the anode compartment 12 of the electrolytic cell 13.

An aqueous sodium hydroxide solution is charged to the catholyte compartment 14 via line 30. The cathode 15 and anode 16 electrodes are immersed in the catholyte 21 and anolyte 22 respectively to a depth sufficient to provide the desired current density at the selected current.

The electrode gap, i.e., the metal-to-metal distance between the anode and cathode, should, of course, be as small as possible in order to obtain optimum voltage characteristics. Depending on the cell configuration, width of the permionic membrane, and the like, the electrode gap is typically between about $\frac{1}{4}$ inch to about $\frac{1}{2}$ inch.

A constant direct current is applied to the cell, and the sodium oxide in the anolyte 22 is decomposed at the anode 16 into sodium ions and oxygen gas which latter may be collected or vented to the atmosphere. Water is concomitantly decomposed at the cathode 15 into hydroxyl ions and hydrogen gas, which latter may also be collected or vented to the atmosphere. Sodium ions migrate from the anolyte 22 through the cation permeable membrane 17 and combine with hydroxyl ions in the catholyte 21 to form sodium hydroxide. Sodium hydroxide solution is withdrawn from the cathode compartment 14 as it is formed and may be recycled via line 18 to the autoclave. Make-up water is added via line 25 to the cathode compartment 14 to maintain the catholyte liquid level.

Sodium silicate solution having a pH greater than 10 and a silica: sodium oxide weight ratio of at least 3:1 is withdrawn from the anode compartment via line 19 and charged to a precipitator 20 wherein it is reacted, in known fashion, with carbon dioxide gas fed via line 28 to precipitate hydrated silica of the desired particle size which is withdrawn from precipitator 20 via line 29. The dilute aqueous sodium carbonate solution from the precipitator is discharged to waste via line 23.

According to the process of the invention, it is possible to produce sodium silicate solution having a $SiO_2$:$Na_2O$ weight ratio of up to about 4.5:1. The process of the invention also provides a cost-saving and more energy efficient alternative to producing sodium silicate by the fusion process. For example, it is estimated that 3.2 ratio sodium silicate solution produced by electrodialysis of a sodium silicate solution produced by the hydrothermal process as contemplated by this invention would result in about 32 percent reduction in energy cost and about 39 percent reduction in maintenance cost as compared with 3.2 ratio sodium silicate solution produced by the fusion process.

Although the invention has been described with particular reference to a preferred embodiment thereof, it is evident that many variations may be made therein which are fully within the contemplative scope thereof. For example, it is contemplated that other alkali metal silicate solutions, for example, potassium silicate, may be treated in accordance with the process of the invention and that the process may be conducted batchwise rather than continuously.

The invention is further illustrated but is not intended to be limited by the following example.

EXAMPLE

A two-compartment cell was constructed of ½ inch polyvinylidene chloride, the cell halves separated by a cation selective permionic membrane. (Both DuPont NAFION® 227 and Polyscience 3270 cation selective permionic membranes were used.) The cell halves, prior to each electrodialysis run, were filled with 4 percent sodium hydroxide solution and rinsed with deionized water.

After rinsing, the cathode compartment was filled with a dilute aqueous sodium hydroxide solution and the anode compartment was filled to an equal level with dilute sodium silicate solution. A series of runs were made at various dilutions. The concentrated sodium silicate solution used as a starting material was a 2.5:1 weight ratio $SiO_2$:$Na_2O$ product supplied by the Philadelphia Quartz Co. having a water content of about 60 percent by weight.

The electrodes (mild steel cathode and an Engelhard-N platinum-iridium coated titanium anode) were immersed in the respective electrolytes to a depth which would provide the desired current density at the applied current and a constant direct current of about 6 amperes was applied. The electrode gap varied from ⅜ inch to ½ inch. At the completion of each run, the anolyte was analyzed for sodium oxide ($Na_2O$) and silica ($SiO_2$) content and the catholyte was analyzed for sodium hydroxide (NaOH) content. The results and conditions of a series of runs using sodium silicate solutions of various ilutions are summarized in Table I.

In the batch electrodialysis of the type described in the foregoing Example, it as observed that most efficient operation of the cell takes place during the early part of the run. With time, the cell voltage climbs and cell efficiency drops as the sodium silicate solution is depleted of sodium. It is expected that in a continuous cell, efficiency would remain relatively constant and would very likely be higher than the cell efficiencies reported for the batch runs.

TABLE I

| Run | | 1 | 2 | 3 | 4 | 5 |
|---|---|---|---|---|---|---|
| Membrane Type | | NAFION® 227 | NAFION® 227 | Polyscience 3270 | Polyscience 3270 | Polyscience 3270 |
| Electrode Gap (in.) | | ⅜ to ½ | ⅜ to ½ | ⅜ to ½ | ⅜ | ⅜ |
| Dilution (anolyte) | | 1:1 | 1:1.5 | 1:1.5 | 1.3 | 1.3 |
| Current Density (ASF) | | 144 | 100 | 100 | 110 | 75 |
| Anolyte | | | | | | |
| Wt. % $Na_2O$ | Initial | 6.39 | 5.14 | 5.02 | 3.24 | 3.29 |
| | Final | 5.28 | 3.61 | 3.63 | 2.10 | 1.98 |
| Wt. % $SiO_2$ | Initial | 16.0 | 12.5 | 12.5 | 8.00 | 8.24 |
| | Final | 16.5 | 12.8 | 12.8 | 8.18 | 8.66 |
| Ratio | Initial | 2.50 | 2.43 | 2.49 | 2.47 | 2.50 |
| | Final | 3.13 | 3.55 | 3.53 | 3.90 | 4.37 |
| Catholyte | | | | | | |
| Wt. % NaOH | Initial | 3.47 | 3.47 | 3.50 | 3.96 | 3.96 |
| | Final | — | 5.68 | 5.55 | 5.17 | 5.45 |
| Length of Run, min. | | 60 | 115 | 107 | 32 | 56 |
| Cell Efficiency | | 72% | 72% | 69% | 84% | 81% |

We claim:

1. A process for increasing the silica:alkali metal oxide weight ratio of aqueous alkali metal silicate solution comprising:

(a) providing an electrolytic cell having a cathode compartment and an associated cathode and an anode compartment and an associated anode, said compartments separated by a cation selective permionic membrane;

(b) charging aqueous alkali metal silicate solution to the anode compartment, said solution having a silica: alkali metal oxide weight ratio of up to about 2.5:1, a pH of at least 11, whereby to maintain the solution free of colloidal suspension or sol of finely divided silica particles, and a water content of at least 75 percent by weight;

(c) charging water or aqueous alkali metal hydroxide solution to the cathode compartment;

(d) applying a direct current across the cell to decompose alkali metal oxide at the anode into alkali metal ions and gaseous oxygen and to cause said alkali metal ions to migrate from the anode compartment through the membrane into the cathode compartment therein forming alkali metal hydroxide;

(e) withdrawing aqueous alkali metal silicate solution from the anode compartment, said solution having a silica: alkali metal oxide weight ratio of about 3:1 to about 4.5:1 and a pH greater than 10, whereby to maintain the solution free of colloidal suspension or sol of finely divided silica particles; and (f) withdrawing alkali metal hydroxide from and adding make-up water to the cathode compartment.

2. The process of claim 1 wherein the aqueous alkali metal silicate solution charged to the anode compartment in aqueous sodium silicate solution and the alkali metal hydroxide solution charged to the cathode compartment is sodium hydroxide solution.

3. The process of claim 1 wherein the aqueous alkali metal silicate solution charged to the anode compartment has a water content of at least about 90 percent by weight.

4. The process of claim 1 wherein the aqueous alkali metal silicate solution charged to the anode compartment has a silica:alkali metal oxide weight ratio of from about 2:1 to about 2.5:1.

* * * * *

UNITED STATES PATENT AND TRADEMARK OFFICE

CERTIFICATE OF CORRECTION

PATENT NO. : 4,303,487

DATED : December 1, 1981

INVENTOR(S) : William W. Carlin and Douglas W. McCann

It is certified that error appears in the above-identified patent and that said Letters Patent are hereby corrected as shown below:

In Claim 2, line 3, "in" should read --is--.

Signed and Sealed this

*Seventeenth* Day of *August 1982*

[SEAL]

*Attest:*

GERALD J. MOSSINGHOFF

*Attesting Officer* *Commissioner of Patents and Trademarks*